United States Patent
Zhang

(10) Patent No.: US 10,549,198 B1
(45) Date of Patent: Feb. 4, 2020

(54) VERIFYING A PLAYER'S REAL WORLD LOCATION USING IMAGE DATA OF A LANDMARK CORRESPONDING TO A VERIFICATION PATHWAY

(71) Applicant: Niantic, Inc., San Francisco, CA (US)

(72) Inventor: Hansong Zhang, Los Altos, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/175,340

(22) Filed: Oct. 30, 2018

(51) Int. Cl.
*A63F 13/65* (2014.01)
*A63F 13/25* (2014.01)

(52) U.S. Cl.
CPC .............. *A63F 13/65* (2014.09); *A63F 13/25* (2014.09)

(58) Field of Classification Search
CPC ........ A63F 13/65; A63F 13/25; A63F 13/655; A63F 13/216; A63F 13/217; A63F 2300/306
USPC .......................................................... 463/30
See application file for complete search history.

(56) References Cited

U.S. PATENT DOCUMENTS

| 8,605,141 | B2 * | 12/2013 | Dialameh | A61H 3/061 348/62 |
| 9,916,693 | B1 * | 3/2018 | Carr | A63F 13/25 |
| 2017/0046891 | A1 * | 2/2017 | Trivelpiece | G07C 9/00111 |
| 2018/0172463 | A1 * | 6/2018 | Morales | G01C 21/20 |

* cited by examiner

*Primary Examiner* — Allen Chan
(74) *Attorney, Agent, or Firm* — Fenwick & West LLP

(57) ABSTRACT

A method and system for verifying a client device's location in a parallel reality game hosted by a server. The client transmits its location to the server and receives verification instructions comprising a landmark and a verification pathway. The client prompts a player to capture image data of the landmark and, in response, receives a first set of image data of the landmark from an initial perspective. The client determines whether the first set of image data matches to the landmark before prompting the player to move along the verification pathway while capturing image data. The client receives a second set of image data of the landmark from a moving perspective. The client determines whether the second set of image data matches to an expected change in perspective of the landmark. Upon completion of the verification instructions, the client confirms to the server the client's location.

20 Claims, 8 Drawing Sheets

VERIFYING A PLAYER'S REAL WORLD LOCATION USING IMAGE DATA OF A LANDMARK CORRESPONDING TO A VERIFICATION PATHWAY

FIELD OF THE INVENTION

The present disclosure relates generally to location-based gaming, and more particularly, to a system and method for verifying a player's real world location as part of a parallel reality game.

BACKGROUND

A parallel reality game providing a shared virtual world that parallels at least a portion of the real world can host a variety of interactions that can attract a community of players. Providing a virtual world with a geography that parallels at least a portion of the real world allows players to navigate the virtual world by navigating the real world. Linking virtual elements in the virtual environment with real world objects, locations, and actions in the real world can encourage players to travel to and notice features in the real world that the players would normally ignore. Providing virtual elements in the same location in the virtual world as their counterpart real world objects and/or locations in the real world increases the feeling that the virtual elements are hidden parts of the real world.

A parallel reality game can include game features that encourage players to interact in the virtual world, such as through social interactions with other players in the virtual world and through various game objectives in the virtual world. Certain game features can be provided to more closely link the parallel virtual world with the real world. A parallel reality game can also include game features that encourage players to interact simultaneously in the real world and the virtual world, for example by coming together in a defined geographic area in the real world at a particular time and date, and while together in the real world interacting with each other as well in the virtual world.

Technology exists that enables individuals to cause a computing device to report its location as being different than its true location, commonly referred to as "spoofing" the device's location. Players who use such technology in playing parallel reality games are similarly referred to as "spoofers." These players can cause problems in these games because spoofing their device locations enables them to access features and events in the parallel virtual world that are intended to be limited to a specific real world location without these players having to physically be present at that real world location. This may cause players who make the effort to go to the real world locations to feel disheartened, and this may give the spoofers an unfair advantage in the game over other players who play the game as intended. Spoofing may also reduce the desirability of the parallel reality game to advertisers and sponsors as spoofers need not visit any specific physical location while playing the game. For example, there is little value to a coffee shop in Vermont in appearing to a player in the game who is physically located in California and spoofing their device's location to make it appear like they are located in Vermont.

SUMMARY

The above and other problems may be addressed by using image data of a landmark captured during player movement with their computing device to verify the player's real world location. On interacting with or coming in proximity to a location or object in the virtual world, the player's client device may verify that it is located at or near the corresponding real world location using information available in the real world. This information may be specific to the player or shared across a group of players (e.g., all players on a team, all players from a particular geographic area, all players worldwide, etc.).

In one embodiment, a method and system for verifying a player's client device location utilizes image data captured by the client device and prompting player movement with the client device along a verification pathway. The verification process includes a server receiving the client device's location and the server preparing verification instructions for the player's client device. The verification instructions include a landmark in proximity to the real world location and a verification pathway for the client device. Upon receiving the verification instructions by the client device, the player's client device prompts the player to capture initial image data of the landmark (which may be a picture or a video of the landmark) specified by the verification instructions. The player's client device may verify that the image data matches to the landmark. Then the client device continues with prompting the player to move along the verification pathway with the client device whilst continually capturing new image data of the landmark. The player's client device verifies once more that the newly captured image data matches to the landmark and that the newly captured image data has a different perspective than the initial image data. In additional embodiments, the client device receives movement data from one or more movement sensors describing physical movement of the device along the verification pathway. The client device may determine whether the movement data matches to the verification pathway. Once the newly captured image data is verified, the player's client device may conclude that the device is at the real world location corresponding to the access point.

Other exemplary implementations of the present disclosure are directed to systems, apparatus, non-transitory computer-readable media, devices, and user interfaces for verifying a player's a player's real world location based on activity in a location-based parallel reality game.

Aspects and advantages of various embodiments are described in the following description. Additional aspects and advantages may be apparent to one of skill in the art based on the description or may become apparent through practice of the embodiments. The accompanying drawings, which are incorporated in and constitute a part of this specification, illustrate various embodiments and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Overview

Figure 1:
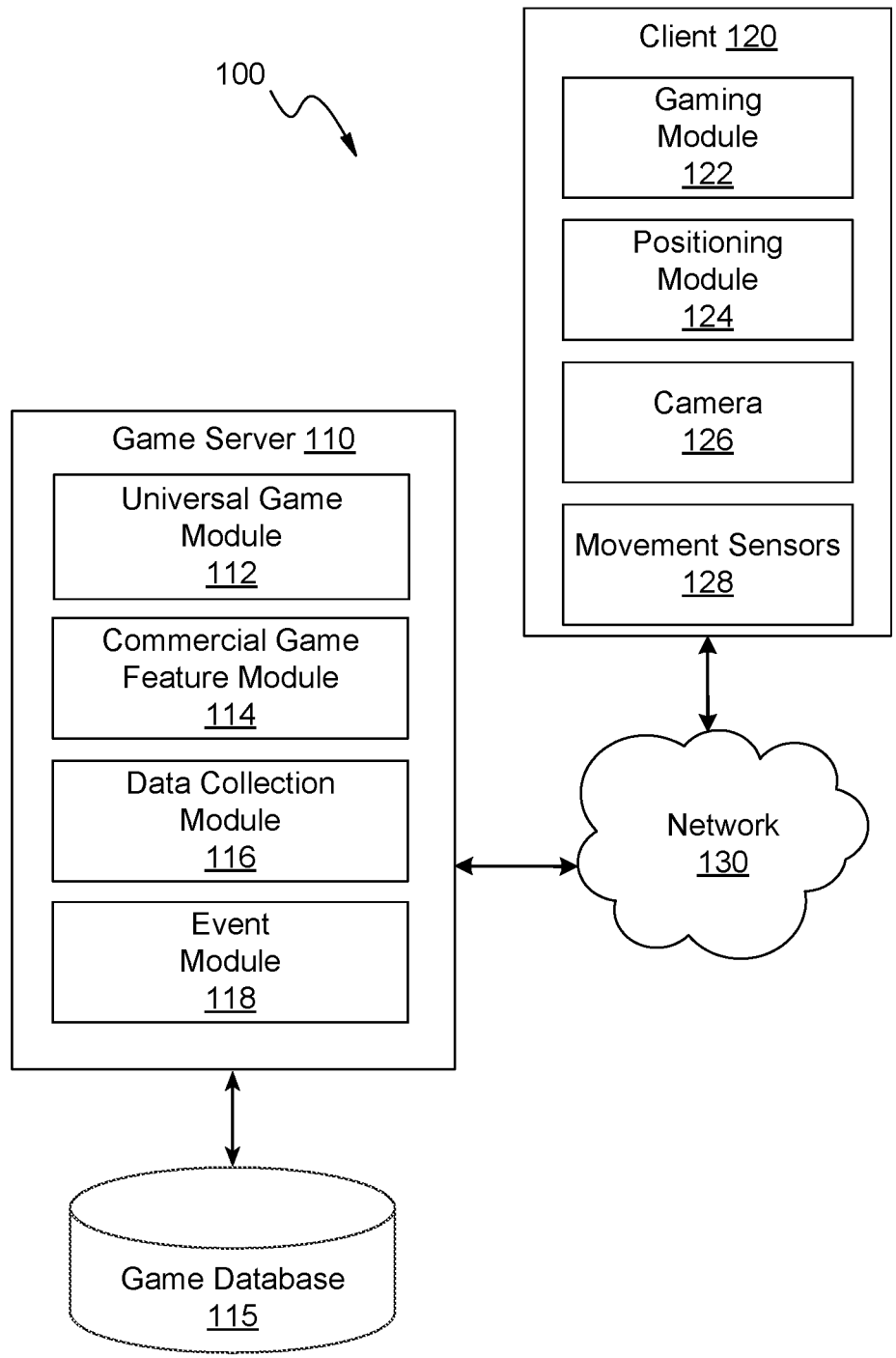
FIG. 1 is a block diagram of a networked computing environment in which a player's real world location may be verified based on activity within a parallel reality game, according to one embodiment.

A game server can host a parallel reality game having a player gaming area that includes a virtual world with a geography that parallels at least a portion of the real world geography. Players can navigate a range of coordinates defining a virtual space in the virtual world by navigating a range of geographic coordinates in the real world. In particular, the positions of players can be monitored or tracked using, for instance, a positioning system (e.g., a GPS system) associated with a player's client device which may be a mobile computing device. Player position information can be provided to the game server hosting the parallel reality game over a network and can be used by the game to update player locations in the virtual world. As a result, as the player continuously moves about in a range of coordinates in the real world with their client device, the game server may update such that the player also continuously moves about in a range of coordinates in the parallel virtual world.

The virtual world can include one or more virtual elements that are linked with real world points of interest. For instance, the virtual world can include various virtual elements associated with points of interest such as landmarks, museums, works of art, libraries, or other areas of interest in the real world. The virtual elements linked with real world point of interest can provide the illusion that the virtual world is a hidden dimension of the real world that a player can interact with by playing the parallel reality game. For instance, as players navigate geographic coordinates in the real world, the players can discover and interact with virtual elements provided in the parallel virtual world. Various game objectives can encourage players to interact with these virtual elements as part of the parallel reality game. In some embodiments, the game server may orchestrate virtual events in the parallel reality game around real world points of interest.

To improve the link between the real world and the parallel virtual world, certain game features can be linked with real world activity, such as real world commercial activity or real world data collection activity, to enhance the impact that actions in the virtual world would have based on actions in the real world and vice versa, thereby, improving the user experience in the parallel reality game. Game features linked with commercial activity in the real world can be included in the parallel reality game such that player actions while playing the parallel reality game can encourage or incentivize commercial activity in the real world. Sponsors, advertisers, businesses, and other entities can request certain game features to be included in the parallel reality game to increase the exposure of their business or other entities to players of the parallel reality game.

The game server hosting the parallel reality game can modify, update, or add to game data stored in a game database associated with the parallel reality game to include certain game features in the parallel reality game. Access-controlled game features can be included that are available only to players who meet certain criteria (e.g., ticket holders for a special event at specified location and time, players who have participated in a particular promotional offer, players who completed specified in-game tasks, or any other definable group). For instance, the game features can be linked to things in the real world (e.g., real world live events, real world points of interest) such that player actions associated with the game features in the virtual world can lead to or encourage commercial activity.

As described previously, it is desirable to ensure that spoofers do not gain access to access-controlled game features or otherwise gain unfair advantages in the game through spoofing techniques. Consequently, at various times (e.g., when a player requests access to access controlled features, periodically during gameplay, when the player is within proximity of certain location, etc.) additional steps may be taken to verify that the player with their client device is in fact at the corresponding real world location. In one embodiment, the game server and the client device utilize image data of a landmark while a player moves along a verification pathway on top of location information provided by a positioning system on the client device to aid in verifying the player's real world location. This verification is difficult for spoofers to fool, reducing the relative return on investment in attempting to fool the system, which in turn may reduce the number of spoofers. Thus, the game experience for other players playing the game fairly may be improved.

Exemplary Location-Based Parallel Reality Gaming System

A parallel reality game is a location-based game having a virtual world geography that parallels at least a portion of the real world geography such that player movement and actions in the real world affect actions in the virtual world and vice versa. Those of ordinary skill in the art, using the disclosures provided herein, will understand that the subject matter described is applicable in other situations where verifying the location of a user is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates one embodiment of a networked computing environment 100 in which a player's real world location may be verified based on activity within a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real world location that corresponds to the virtual location of the virtual element in the virtual world. For convenience, various embodiments are described with reference to "the player's location" but one of skill in the art will appreciate that such references may refer to the location of the player's client device 120.

Figure 2:
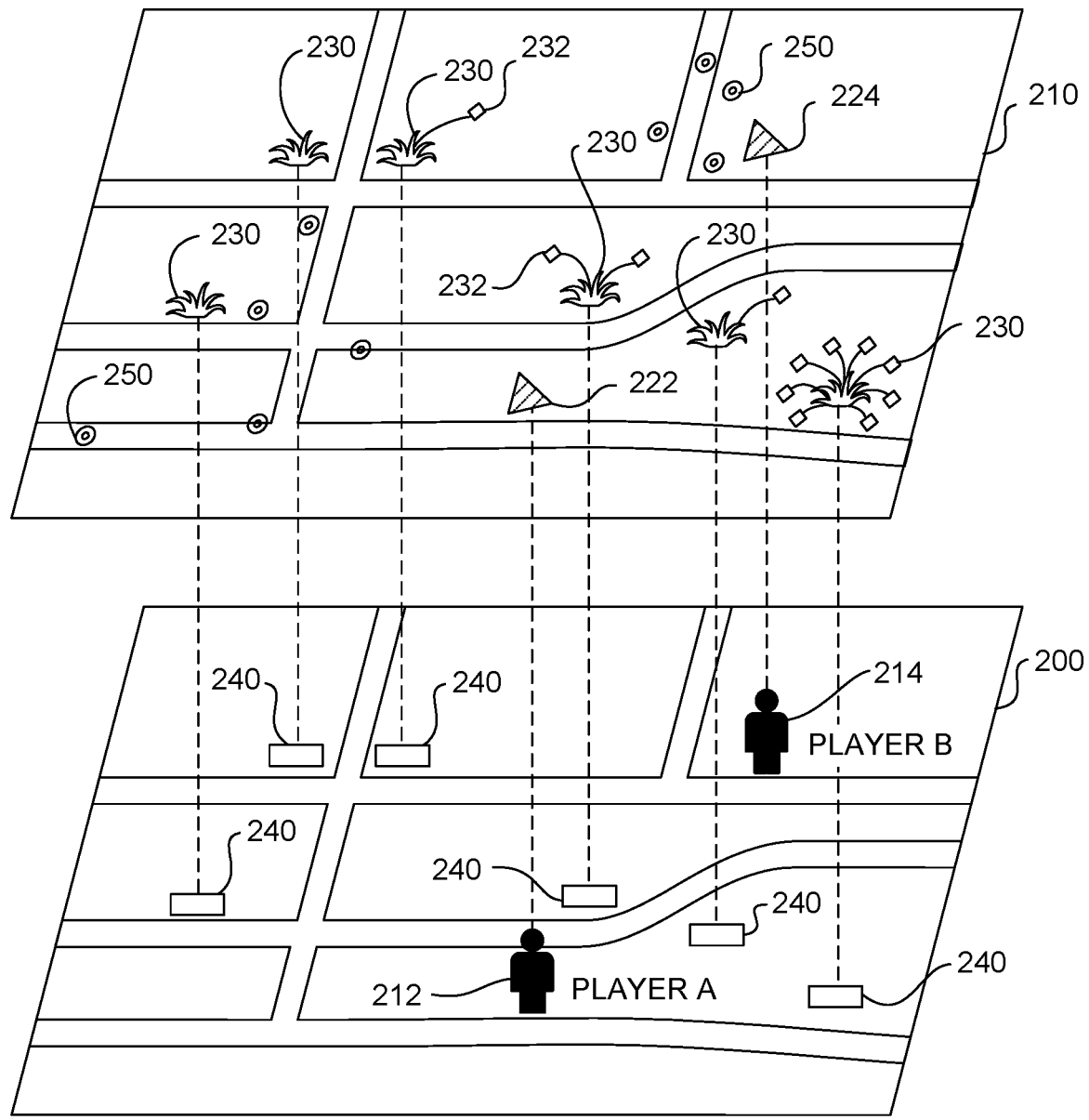
FIG. 2 depicts a representation of a virtual world having a geography that parallels the real world, according to one embodiment.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230. In some embodiments, the interaction with the virtual element 230 may further prompt verification of the player's location in the real world 200 matching the player's location in the virtual world 210.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward that can be used throughout the game (e.g., to purchase in-game items). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 110 communicates with one or more clients 120 over a network 130 to provide a parallel reality game to players at the clients 120. The networked computing environment 100 also may include other external systems such as sponsor/advertiser systems or business systems. Although only one client 120 is illustrated in FIG. 1, any number of clients 120 or other external systems may be connected to the game server 110 over the network 130. Furthermore, the networked computing environment 100 may contain different or additional elements and functionality may be distributed between the clients 120 and the server 110 in a different manner than described below.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the parallel reality game to be served or provided to the client(s) 120 over the network 130.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 (for instance via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client 120 can be configured to periodically send player input and other updates to the game server 110, which the game server 110 uses to update game data in the game database 115 to reflect any and all changed conditions for the game.

In the embodiment shown, the server 110 includes a universal gaming module 112, a commercial game feature module 114, a data collection module 116, and an event module 118. The game server 110 interacts with a game database 115 that may be part of the game server 110 or accessed remotely (e.g., the game database 115 may be a distributed database accessed via the network 130). In other embodiments, the game server 110 contains different and/or additional elements. In addition, the functions may be distributed among the elements in a different manner than described. For instance, the game database 115 can be integrated into the game server 110.

The universal game module 112 hosts the parallel reality game for all players and acts as the authoritative source for the current status of the parallel reality game for all players. The universal game module 112 receives game data from clients 120 (e.g. player input, player position, player actions, landmark information, etc.) and incorporates the game data received into the overall parallel reality game for all players of the parallel reality game. The universal game module 112 can also manage the delivery of game data to the clients 120 over the network 130. The universal game module 112 may also govern security aspects of clients 120 including but not limited to securing connections between the clients 120 and the game server 110, establishing connections between various clients 120, and verifying the location of the various clients 120.

The commercial game feature module 114, in embodiments where one is included, can be separate from or a part of the universal game module 112. The commercial game feature module 114 can manage the inclusion of various game features within the parallel reality game that are linked with a commercial activity in the real world. For instance, the commercial game feature module 114 can receive requests from external systems such as sponsors/advertisers, businesses, or other entities over the network 130 (via a network interface) to include game features linked with commercial activity in the parallel reality game. The commercial game feature module 114 can then arrange for the inclusion of these game features in the parallel reality game.

The game server 110 can further include a data collection module 116. The data collection module 116, in embodiments where one is included, can be separate from or a part of the universal game module 112. The data collection module 116 can manage the inclusion of various game features within the parallel reality game that are linked with a data collection activity in the real world. For instance, the data collection module 116 can modify game data stored in the game database 115 to include game features linked with data collection activity in the parallel reality game. The data collection module 116 can also analyze and data collected by players pursuant to the data collection activity and provide the data for access by various platforms. Various embodiments of the data collection module 116 are described in greater detail below, with reference to FIG. 6.

The event module 118 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors, or other such device. In short, a client 120 can be any computer device or system that can enable a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, cameras, and/or a microphone suitable for voice recognition. The client 120 may also include other various sensors for recording data from the client 120 including but not limited to movement sensors, accelerometers, gyroscopes, other inertial measurement units (IMUs), barometers, positioning systems, thermometers, light sensors, etc. The client 120 can further include a network interface for providing communications over the network 130. A network interface can include any suitable components for interfacing with one more networks, including for example, transmitters, receivers, ports, controllers, antennas, or other suitable components.

Because the networked computing environment 100 provides a location-based game, the client 120 is preferably a portable computing device that can be easily carried or otherwise transported with a player, such as a smartphone or tablet. In the embodiment shown in FIG. 1, each client 120 includes software components such as a gaming module 122 and a positioning module 124 with various physical components such as a camera 126 and a plurality of movement sensors 128. In other embodiments, the clients 120 may include different or additional elements such as a display (as a component of the client 120 or external to the client 120), various input devices (e.g., a touchscreen, a mouse, a stylus, The gaming module 122 provides a player with an interface to participate in the parallel reality game. The game server 110 transmits game data over the network 130 to the client 120 for use by the gaming module 122 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

The gaming module 122 executed by the client 120 provides an interface between a player and the parallel reality game. The gaming module 122 can present a user interface on a display device associated with the client 120 that displays a virtual world (e.g. renders imagery of the virtual world) associated with the game and allows a user to interact in the virtual world to perform various game objectives. The gaming module 122 can also control various other outputs to allow a player to interact with the game without requiring the player to view a display screen. For instance, the gaming module 122 can control various audio, vibratory, or other notifications that allow the player to play the game without looking at the display screen. The gaming module 122 can access game data received from the game server 110 to provide an accurate representation of the game to the user. The gaming module 122 can receive and process player input and provide updates to the game server 110 over the network 130.

The positioning module 124 can be any device or circuitry for monitoring the position of the client 120. For example, the positioning module 124 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 124 may further include various other sensors that may aid in accurately positioning the client 120 location.

As the player moves around with the client 120 in the real world, the positioning module 124 tracks the position of the player and provides the player position information to the gaming module 122. The gaming module 122 updates the player position in the virtual world associated with the game based on the actual position of the player in the real world. Thus, a player can interact with the virtual world simply by carrying or transporting the client 120 in the real world. In particular, the location of the player in the virtual world can correspond to the location of the player in the real world. The gaming module 122 can provide player position information to the game server 110 over the network 130 such that the universal gaming module 112 keeps track of all player positions throughout the game. In response, the game server 110 may enact various techniques to verify the client 120 location to prevent cheaters from spoofing the client 120 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Computing System

Figure 8:
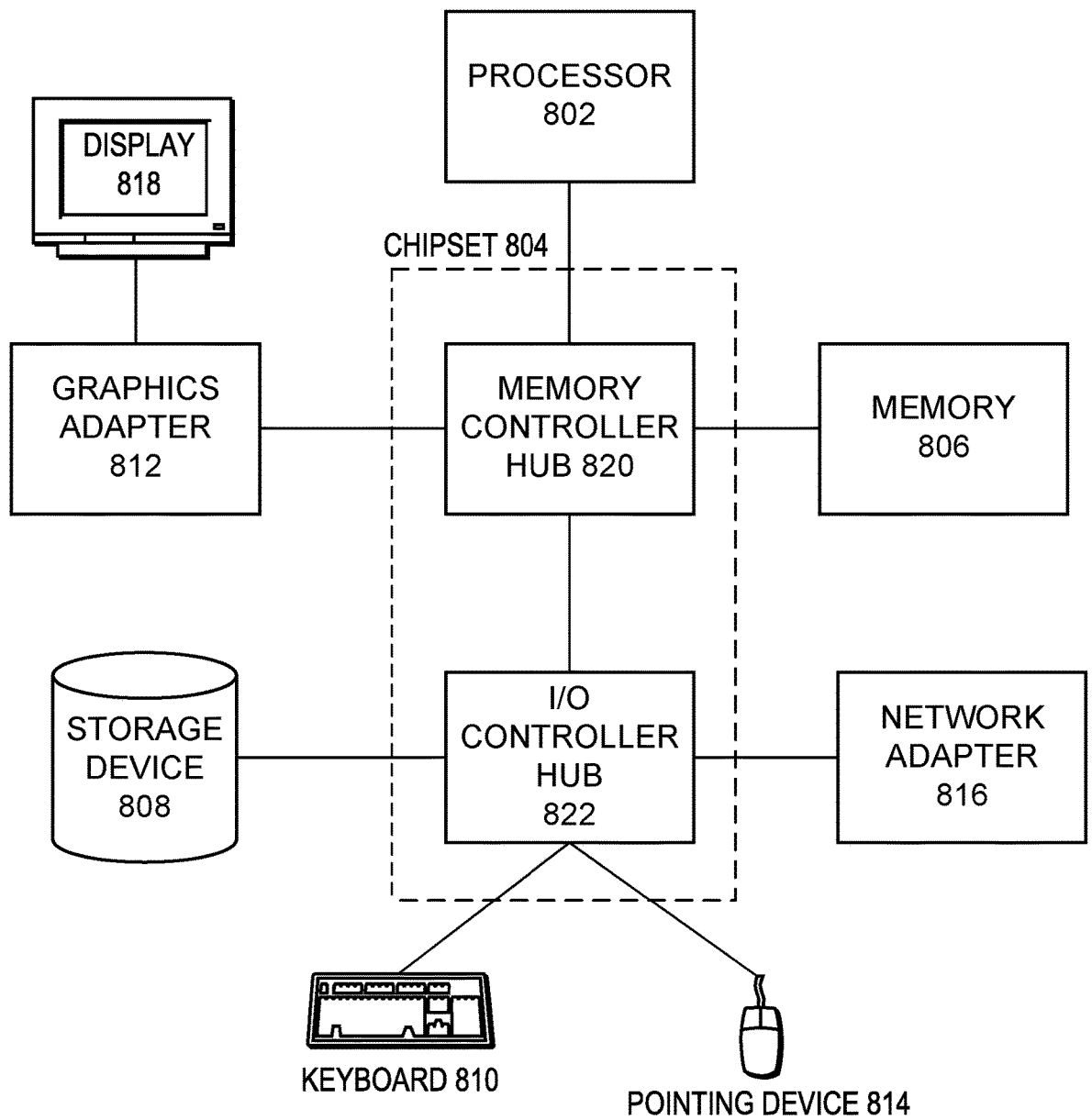
FIG. 8 is an example architecture of a computing device, according to one embodiment.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random access memory, such as DRAM, SRAM, DDR RAM, ROM, EEPROM, flash memory.

As is known in the art, a computer 800 can have different and/or other components than those shown in FIG. 13. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 302.

Exemplary Game Interface

Figure 3:
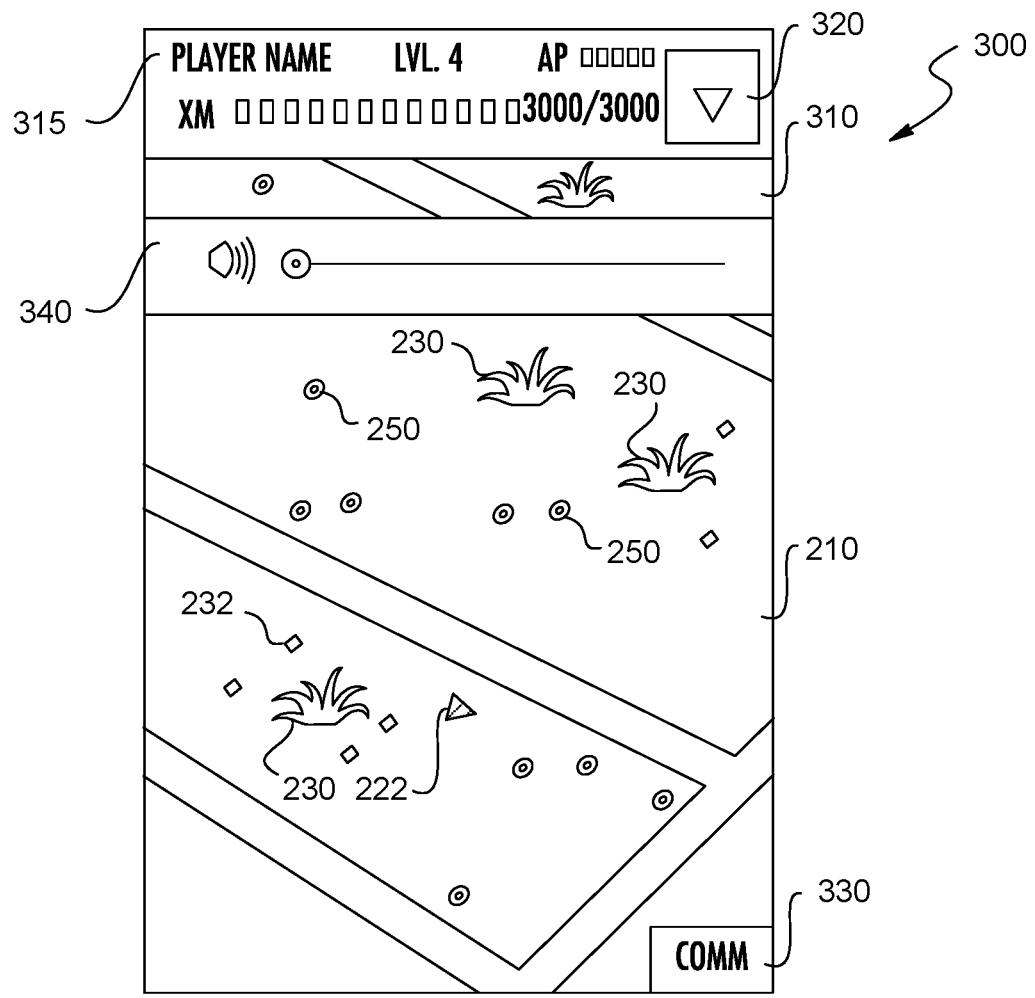
FIG. 3 depicts an exemplary game interface of a parallel reality game, according to one embodiment.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Operation of Parallel Reality Game Client-Server Flow Diagram

Figure 4:
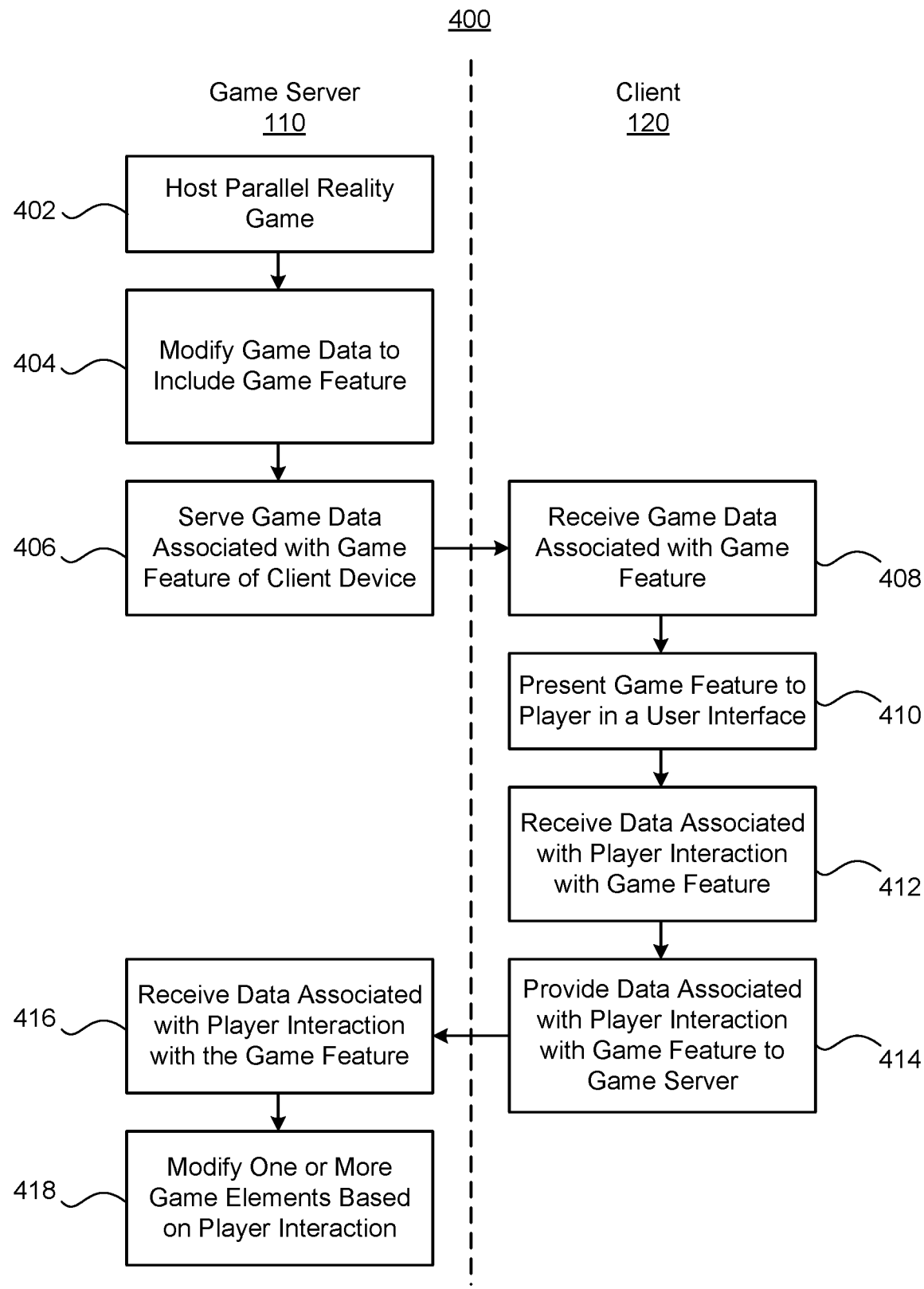
FIG. 4 is a server-client interaction diagram of a method for linking real world activity with a parallel reality game, according to one embodiment.

FIG. 4 depicts a client-server flow diagram of a method 400 for linking real world activity with a parallel reality game, according to one embodiment. The method 400 can be implemented using any suitable computing system, such as the client-server arrangement of the system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

In the embodiment shown in FIG. 4, the method 400 begins at 402 with a game server 110 hosting the parallel reality game for a plurality of client devices 120. Players can access the parallel reality game by communicating with the game server 110 over the network 130 via one or more client devices 120. In this manner, the game server 110 may act as an authoritative source of events for the parallel reality game.

At 404, the server can modify game data associated with the parallel reality game to include a game feature. For instance, the game server 110 can modify, update, or add game data to the game database 115 such that a game feature is included in the parallel reality game. Some game features may be linked with a real world activity. These game features can be any game feature designed to incentivize or encourage activity by players in the real world, including activities in the real world not directly related to the overall game objective for the parallel reality game. In particular embodiments, the game feature linked with a real world activity can be a game feature linked with a commercial activity in the real world.

At 406, the game server 110 serves the parallel reality game, including the game features, to one or more client devices 120 over the network 130. At 408, a client device 120 receives the game data from the game server 110 including data associated with the game feature. The client device 120 then presents the parallel reality game, including the game features to a player at 410. For instance, a client device 120 can display a visual representation of the virtual world. The virtual world can include the game feature, such as a virtual element located at a specific location in the virtual world to encourage or incentivize player activity in the real world.

At 412, the client device 120 includes receiving data associated with player interaction with the game feature. For instance, a client device 120 can receive data as a result of a player action directed toward the game feature in the parallel reality game. The data associated with a player interaction can include data associated with a player navigating to a location of a particular virtual element and interacting with the virtual element. As another example, the data associated with a player interaction can include data associated with a player taking actions to complete a game objective or task. As another example, the data associated with a player interaction can include data associated with a player using a power up or other enhanced power provided to a player as part of the game feature linked with the real world activity. At 414, the client device provides the data associated with player interaction with the game feature to the server.

The data associated with the player interaction with the game feature can be received at the game server 110 at 416. For instance, the game server 110 can receive the data associated with player interaction with the game feature from a client device 120 over the network 130. The game server 110 can then modify one or more game elements in the parallel reality game based on the data associated with the player interaction at 418. For instance, the game server 110 can update game data stored in the game database 115 associated with a player (such as a player profile stored in the game database 115) to record the player's interaction with the game feature linked with the real world activity. In addition, the server can update game data to provide a reward, such as a virtual reward suitable for use in the parallel reality game, for interacting with the game feature. The virtual reward can include a virtual item, virtual energy, virtual currency, virtual power-up, enhanced power, experience points, or any other suitable reward.

Player Client Device Location Verification

Figure 5:
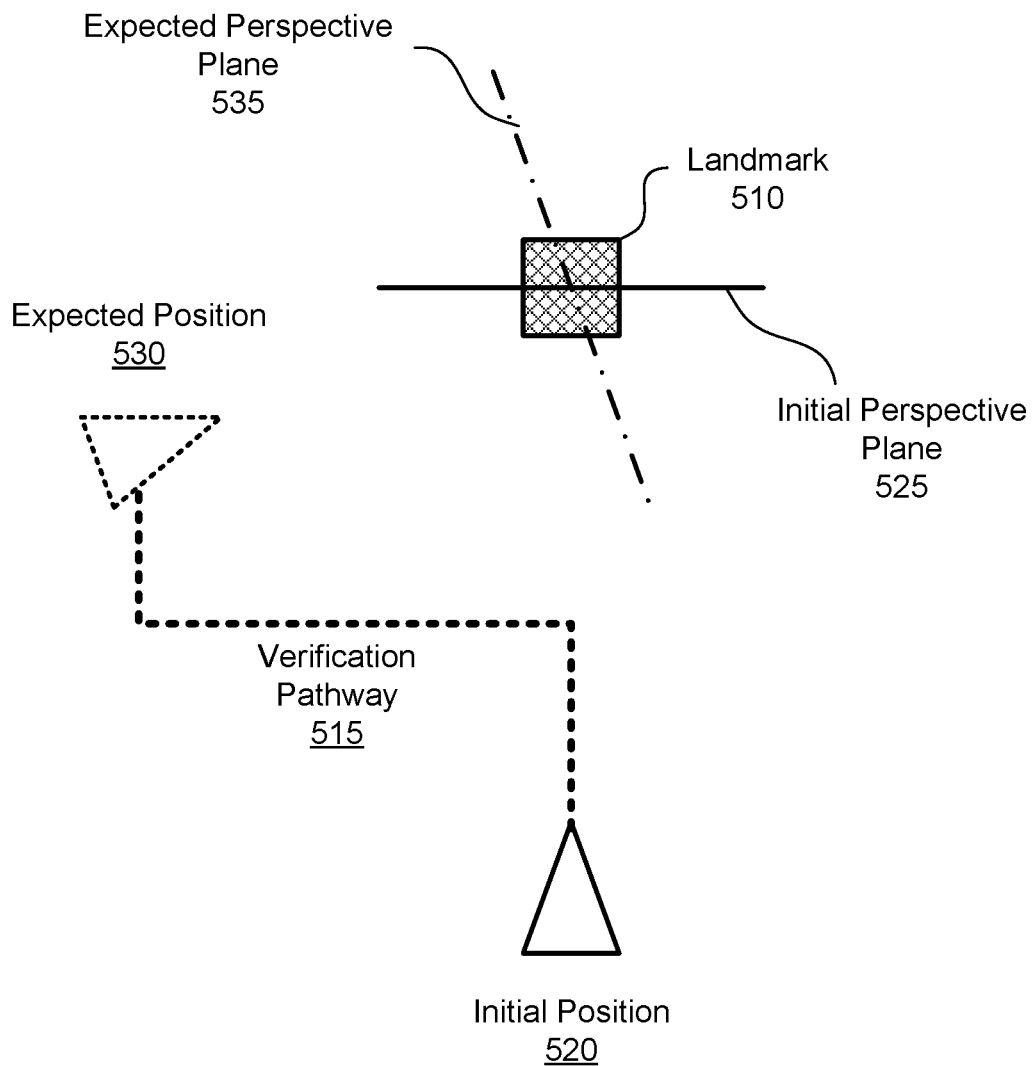
FIG. 5 is an illustration of a verification process for verifying a player's client device real world location, according to one embodiment.

FIG. 5 is a top plan view illustrating a process of verifying a player's client device 120 location, in accordance with an embodiment. The process can be implemented using any suitable computing device(s) or combination of suitable computing devices, such as the client device 120 and the game server 110 of FIG. 1. In this illustrative embodiment, the client device 120 is reporting to the game server 110 a supposed location of the client device in the real world (e.g., from the positioning module 122 to the game server 110 via the network 130). The game server 110 initiates the process of verifying the client device's 120 is actually located at the supposed location. One skilled in the art, using the principles disclosed herein, will appreciate that various steps of the methods disclosed herein can be omitted, rearranged, combined, and/or adapted in various ways without deviating from the scope of the present disclosure.

The client device 120 utilizes the position module 124 to determine the supposed location of the client device 120. The client device 120 may be reporting to the game server 110 that the client device is at the supposed location and may be attempting to retrieve content (in some examples, access controlled content) specific to the reported location. The game server 110 aims to ensure that the client device 120 is indeed at the reported location.

The game server 110 generates a set of verification instructions to the client device 120 for verifying the client device's 120 location. For various locations in the real world that correspond to locations in the virtual world, the game server 110 may store a unique real world object or landmark for use in verifying locations of client devices of players. The game server 110 may alternatively assign a unique landmark in vicinity to a real world commercial activity which the game server 110 may use to verify the locations of client devices to ensure provision of game content accessible only by client devices present at the real world locations where the real world commercial activity resides. For instance, if a coffee shop is a sponsor of the parallel reality game, a nearby statue may be used as a unique landmark for verifying client devices are in the vicinity of the coffee shop before providing game content specific to the coffee shop.

Or in another instance, the game server 110 may assign a unique landmark to a real world location where a virtual game event is being hosted. The game server 110 may then verify the client device 120 is located near the landmark in order for the players to participate in the virtual game event. The game server 110 may store the landmarks for each potential location in the real world corresponding to locations in the virtual world in the game database 115. In addition, the stored landmarks in the game database 115 may include a name of the landmark, a model of the landmark, pictures of the landmark from varying perspectives, 3D surrounding environment of the landmark, etc. In order to verify the client device's 120 location, the game server 110 accesses the game database 115 for a stored landmark corresponding to the client device's location where the client device is requesting to retrieve content at that virtual location. The game server 110 generates a verification pathway describing a series of movements to prompt the player to make whilst holding the client device 120. The verification pathway effectively describes a series of movements of the client device which may include instructions for any combination of movements of the player while the player holds the client device 120 generally constant relative to the player and movements of the client device 120 by the player while the player generally remains constant relative to the landmark. The stored landmark and the verification pathway make up the set of verification instructions. The set of verification instructions are transmitted to the client device 120.

In the embodiment shown in FIG. 5, the client device 120 receives the set of verification instructions and verifies the client device 120 location. The client device 120 prompts the player to capture image data of a landmark 510 received from the verification instructions at an initial position 520. The player captures image data of the landmark 510 with the client device 120. From the initial position 520, the captured image data has a perspective of the landmark 510 that is parallel to the initial perspective plane 525. Although the image data at the initial position 520 may include objects in front of or behind the initial perspective plane 525 (e.g. objects unobstructed within a viewing frustum of the client device 120), the initial perspective plane 525 is perpendicular to a sightline from the initial position 520. In an example, the landmark 510 is a statue of a person. From the initial position 520, the initial perspective plane 525 encompasses a direct frontal view of the person. The client device 120 determines whether or not the captured image data from the initial position 520 matches the landmark 510 data from the set of verification instructions. In some embodiments, the client device 120 utilizes image recognition techniques (e.g., machine learning pattern recognition algorithms) for determining whether the captured image data from the initial position 520 includes the landmark 510. In some embodiments, the client device 120 uses a trained image recognition model from the game server 110.

If the client device 120 confirms the captured image data is of the landmark 510, the client device 120 prompts the player to move according to a verification pathway 515 in the verification instructions. The player, in response, moves accordingly along the verification pathway 515. In the illustration of FIG. 5, the verification pathway 515 may include a first step of moving forward five meters towards the landmark 510, then another step of making a left turn and moving another ten meters, then a final step of making a right turn and moving another two meters. In other examples, the verification pathway 515 may be prompted with other units of measurement, e.g., feet, yards, etc., or the user may just be prompted with an on-screen indication of direction (e.g., an arrow) and then provided with another indication when the user has moved the required distance (e.g., the arrow disappearing, a stop sign, etc.). If the player's movement path matches that of the verification pathway 515, the verification instructions anticipate the player arriving at an expected position 530. The client device 120 also prompts the player to capture image data of the landmark 510 during and/or after movement along the verification pathway 515.

If the client device 120 captures image data of the landmark 510 at the expected position 530, the captured image data would be parallel to an expected perspective plane 535. Similar to the initial perspective plane, the expected perspective plane 535 is perpendicular to a sightline from the expected position 530. Notably, the expected perspective plane 535 after movement along the verification pathway 515 is not parallel to the initial perspective plane 525. Following the example with the statue, the expected perspective plane 535 encompasses an offset side view of the statue. The client device 120 uses the newly captured image data of the landmark 510 to corroborate the initial set of image data. The client device 120 confirms that the newly captured image data also is of the landmark 510. The client device 120 further determines whether the newly captured image data has a different perspective of the initial set of image data based on the verification instructions. For example, the client device 120 determines that the newly captured image data of the landmark 510 at the expected position 530 is an offset side view of statue which differs from the initially captured image data of the landmark 510 being a direct frontal view of the statue. In some embodiments, the newly captured image data during and/or after movement along the verification pathway 515 includes video of the landmark 510. The client device 120 may determine whether frames of the video match to the landmark 510 and that the frames are at varying perspectives from the initial perspective plane 525. In some embodiments, if the client device 120 confirms the initial and newly captured image data match the landmark 510, then the client device 120 verifies the client device 120 location.

In additional embodiments, the client device 120 uses movement sensors 128 to also confirm client device 120 movement along the verification pathway 515 prior to confirmation verification of the client device 120 location. The movement sensors 128 may detect and record translational movement corresponding to a player moving along the verification pathway 515. In some embodiments, the client device 120 measures the translational movement by the player with the client device 120. The client device 120 may determine whether the translation movement measured is within a reasonable threshold of movement that may generally correspond to the player moving along the verification pathway 515. For instance, the client device 120 may have a threshold angular error for making a turn by the player. Such that given a player is prompted to make a left turn by the client device 120 according to the verification pathway 515 with a threshold angular error of 15 degrees, if the movement sensors 128 determine the player to have made a right turn (i.e. 180 degrees of error for the left turn), then the client device 120 determines that the turn made by the player is above the threshold angular error for making the left turn (i.e. 180 degrees of error is above the threshold of 15 degrees). In another instance, the client device 120 may have a threshold distance error for paces made by the player. Such that given the player is prompted to take five meters in one direction, if the movement sensors 128 detect translational movement of 100 meters which is significantly different than the prompted five meters, then the client device 120 would also determine the player movement to not match the verification pathway 515. If the movement sensors 128 detect movement error corresponding to movement above the thresholds of error, then the client device 120 may reject the client device 120 location. If the movement sensors 128 detect movement within the thresholds for error, then the client device 120 may verify the client device 120 location in addition to checking the image data of the landmark 510.

Figure 6:
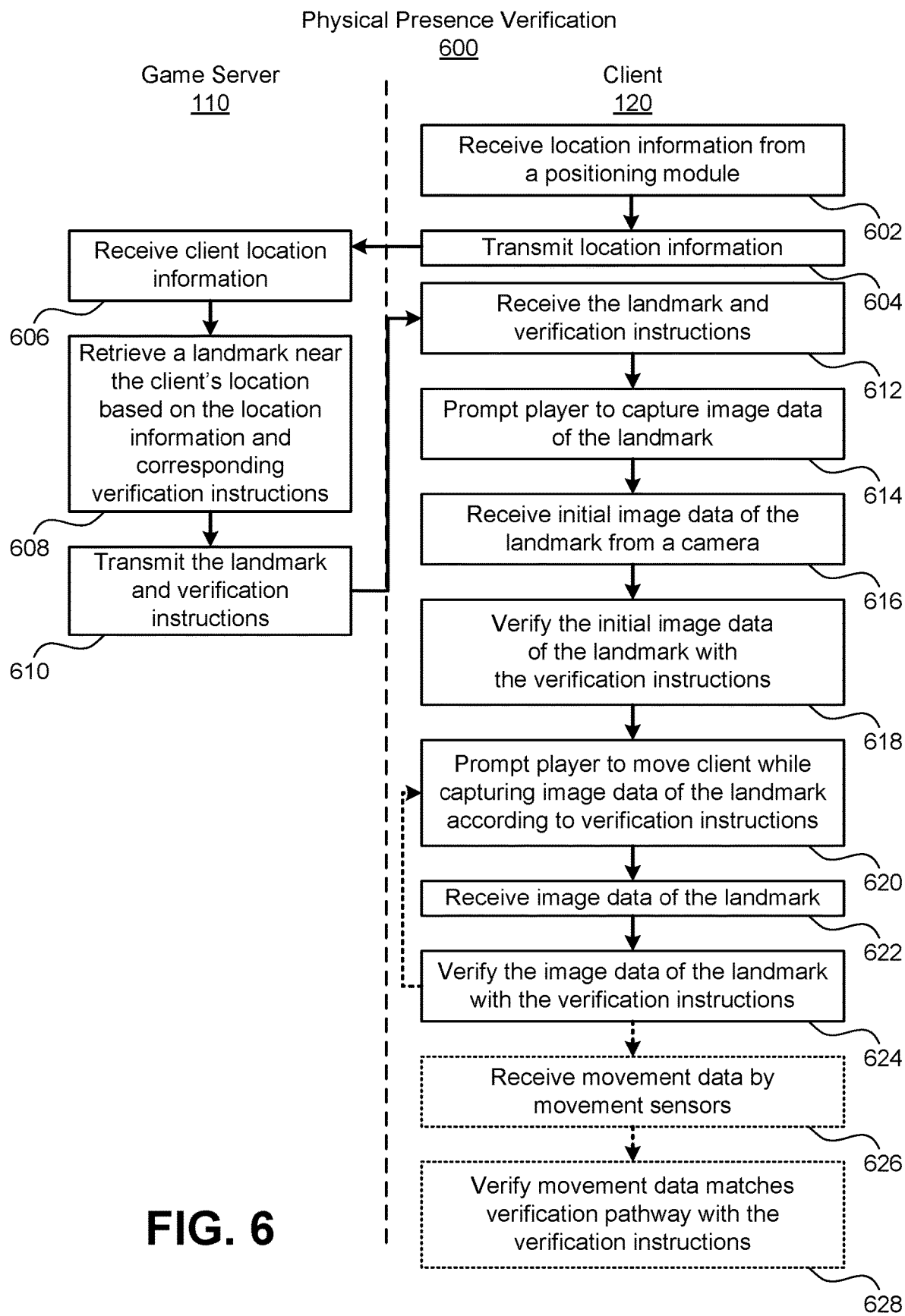
FIG. 6 is a server-client interaction diagram of a method for verifying the player's client device real world location, according to one embodiment.

FIG. 6 depicts a client-server flow diagram of a method 600 for verifying a client device's 120 location, according to one embodiment. The method 600 can be implemented using any suitable computing system, such as the client-server arrangement of the system 100 of FIG. 1. In addition, although FIG. 6 depicts steps performed in a particular order or by a particular device for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

The client device 120 at 602 of the method 600 receives location information from a positioning module (e.g., the positioning module 124). In some embodiments, the position module may include one or more positioning systems such as a satellite navigation positioning system (e.g. a GPS system, a Galileo positioning system, the Global Navigation satellite system (GLONASS), the BeiDou Satellite Navigation and Positioning system), an inertial navigation system, and/or a dead reckoning system, based on IP address, by using triangulation and/or proximity to cellular towers or Wi-Fi hotspots. The location information of the client device 120 location may comprise a set of global positioning coordinates of the client device 120.

The client device 120 at 604 of the method 600 transmits the location information to the game server 110. The game server 120 at 606 receives the client device 120 location information. As the game server 120 receives the location information, the game server 120 needs to verify the location information accurately corresponds to the physical location of the client device 120. In some embodiments, the location information is received in tandem with a request for game content specific to the client device's 120 location shared in the location information.

The game server 110 at 608 of the method 600 retrieves a landmark nearby the client device's 120 location based on the location information and corresponding verification instructions. The game server 110 accesses a database (e.g., the game database 115) with stored landmarks. The game server 110 may determine which landmark to use for verification of the client device's 120 location based on a proximity of the client device's 120 location compared to locations of all stored landmarks. The game server 110 may choose the closest landmark to the client device's 120 location. In other embodiments, the client device 120 is attempting to participate in a game event at a particular location in the real world. The game server 110 may refer to a landmark that is tied to the game event, utilizing that landmark in verifying locations of all client devices attempting to participate in the game event. In some other embodiments, the game server 110 may be providing access-controlled game content to players that are interacting with real world commercial activity. In these instances, the game server 110 may also refer to a landmark that is tied to the real world commercial activity. In some embodiments, when retrieving the landmark from the database, the game server 110 also may retrieve any combination of images or models of the landmark for use in verifying the presence of the client device's 120 location.

The game server 110 at step 608 also gathers verification instructions. In some embodiments, the game server 110 may retrieve pre-generated verification instructions from the database associated with the selected landmark; whereas, in other embodiments, the game server 110 generates a set of verification instructions with one or more verification instructions generated randomly. The verification instructions include a set of prompts including a prompt for the player to capture image data of the selected landmark from an initial position of the client device 120. The image data may comprise either a picture of the landmark or a video of the landmark. The verification instructions include a landmark recognition model which can verify that image data captured by the client device 120 positively matches the landmark.

The landmark recognition model may include a two-dimensional (2D) model of the landmark, a 3D model of the landmark, or a combination thereof. In one embodiment using a 2D model, the landmark recognition model includes points of features on the landmark in addition to relative distances between pairs of points. When verifying image data as images, the landmark recognition model may calculate relative distances between identified points on the landmark and compare the calculated relative distances to those known in the landmark recognition model. If, for example, the relative height to the width of the landmark does not match the relative height to the width included in the landmark recognition model, then the landmark recognition model may determine the image data to not match the appropriate landmark. In another embodiment using a 2D model, the landmark recognition model may be a machine learning model trained with training image data of the landmark, the machine learning model able to verify the captured image data matches that of the training image data of the landmark. In some embodiments using a 3D model, the landmark recognition model includes a partial or a complete 3D virtual representation of the landmark. In the 3D virtual representation, approximate dimensions of the landmark are known including approximate distances between features, approximate angles, etc.

The verification instructions include a verification pathway which comprises a set of prompts for the player to move accordingly to the verification pathway with the client device 120. In some embodiments, the verification instructions may be pre-generated by the game server 110. In other embodiments, the game server 110 generates a random verification pathway for each instance of verifying locations of client devices or a verification pathway may be selected randomly from a set of predetermined pathways. The verification pathway may include multiple prompts for movement by the player with the client device 120. For example, the verification pathway may include a combination of turns with a distance to travel after each turn (which can be labeled in units of measurement such as meters, yards, feet, centimeters, etc.). In some embodiments, the game server 110 also provides an expected perspective of the landmark after movement by the client device 120 according to the verification pathway in the verification instructions for verifying movement of the player and client device 120. The game server 110 may determine the expected perspective of the landmark by predicting perspectives of the landmark using a 3D model of the landmark while moving along the verification pathway. The verification instructions also include a prompt for the player to capture image data with the client device 120 for any combination of during and after movement along the verification pathway. In example A, the verification instructions include prompts to: (1) capture a picture of the landmark, (2) move forward towards the landmark four meters while capturing video of the landmark, (3) turn left and move forward two meters while capturing video of the landmark, and (4) capture another picture of the landmark.

The game server 110 at step 608 may also generate prompts for the player to provide other inputs during and/or after moving along the verification pathway. The other inputs may be received through other sensors or components on the client device 120. In one instance, the verification instructions include an instruction to prompt the player to speak which can be verified by an audio microphone on the client device 120. In this instance, the game server 110 may also include verification instructions to match the acoustic signals from the audio microphone to the prompted speech. In another instance, the verification instructions include an instruction to prompt the player to touch a button on the client device 120. These other instructions may be interspersed within the instructions prompting the player to move along the verification pathway. In example B, the verification instructions include prompts to: (1) capture a picture of the landmark, (2) move forward towards the landmark ten meters while capturing video of the landmark, (3) state the landmark's name, (4) turn right and move forward three meters while capturing video of the landmark, and (5) capture another picture of the landmark. In example C, the verification instructions include prompts to: (1) capture a picture of the landmark, (2) turn left and move forward two meters, (3) press a button on the client device 120, (4) turn right and move forward ten meters, and (4) capture another picture of the landmark.

The game server 110 at step 610 of the method 600 transmits the landmark and the verification instructions to the client device 120. The methods continues at step 612 with the client device 120 receiving the landmark and verification instructions. The client device 120 then proceeds to verify the client device's location according to the received landmark and verification instructions.

The client device 120 at step 614 of the method 600 prompts the player to capture initial image data of the landmark based on the verification instructions. The verification instructions comprises a first step of prompting the player to capture initial image data of the landmark which may comprise a video or picture of the landmark. The client device 120 based on the verification instructions prompts the player to capture image data of the landmark via the electronic display on the client device 120.

The client device 120 at step 616 of the method 600 receives the initial image data of the landmark. In some embodiments, the client device 120 may receive any combination of photos and video of the landmark.

The client device 120 at step 618 of the method 600 verifies the initial image data of the landmark with the verification instructions. The received verification instructions may include a landmark recognition model for positively identifying pictures to be of the landmark. In embodiments where the client device 120 receives video of the landmark, the client device 120 may compare one or more frames of the video with the landmark recognition model to positively identify the landmark in the video. In some embodiments, the landmark recognition model comprises a trained machine learning model that may positively identify the landmark in the picture or video received by the client device 120. In some additional embodiments, the client device 120 provides the game server 110 with captured image data for further refinement of the landmark recognition model, e.g., using the image data to build up one or more of the 2D model of the landmark and the 3D model of the landmark.

The client device 120 at step 620 of the method 600 prompts the player to move client device along the verification pathway while capturing image data of the landmark according to the verification instructions. In some embodiments, the verification instructions include a set of prompts for movement by the player whilst holding the client device 120, the set of prompted movements making up the verification pathway. In some embodiments, the verification instructions may include further prompts for player input to the client device 120. The prompts may be presented by the client device 120 through any combination of visually via an electronic display and orally via an audio speaker. The client device 120 also prompts the player to capture image data of the landmark during and/or after movement along the verification pathway. In one example, the client device 120 may prompt the player to capture image data of the landmark, such as a picture, at various instances throughout the verification pathway. In another example, the client device 120 may prompt the player to capture a video of the landmark throughout movement along the verification pathway. Following up with example A, the client device 120 may provide prompts to the player to: (1) capture a picture of the landmark, (2) move forward towards the landmark four meters while capturing video of the landmark, (3) turn left and move forward two meters while capturing video of the landmark, and (4) capture another picture of the landmark. In some embodiments, the client device 120 may provide the prompts for the verification pathway all at once or progressively. When doing so all at once, the client device 120 may display all steps of the verification instructions on the electronic display. In embodiments with other prompts and instructions, the client device 120 may also provide the other prompts and instructions. These prompts and instructions may include providing other player inputs.

In some embodiments, the client device 120 may request a new verification pathway for verifying the client device's 120 location. The player may provide this request to the client device 120 for any number of reasons. In one instance, a portion of the verification pathway is currently obstructed in the real world. This issue may be overcome by requesting a new verification pathway until one such verification pathway obviates the need for the player to move through the obstructions. According to this request, the game server 110 may generate a new random verification pathway with additional verification instructions to be provided to the client device 120. Upon receipt of the new verification pathway and additional verification instructions, the client device 120 may proceed with verifying its location with the new verification pathway and additional verification instructions.

Figure 7:
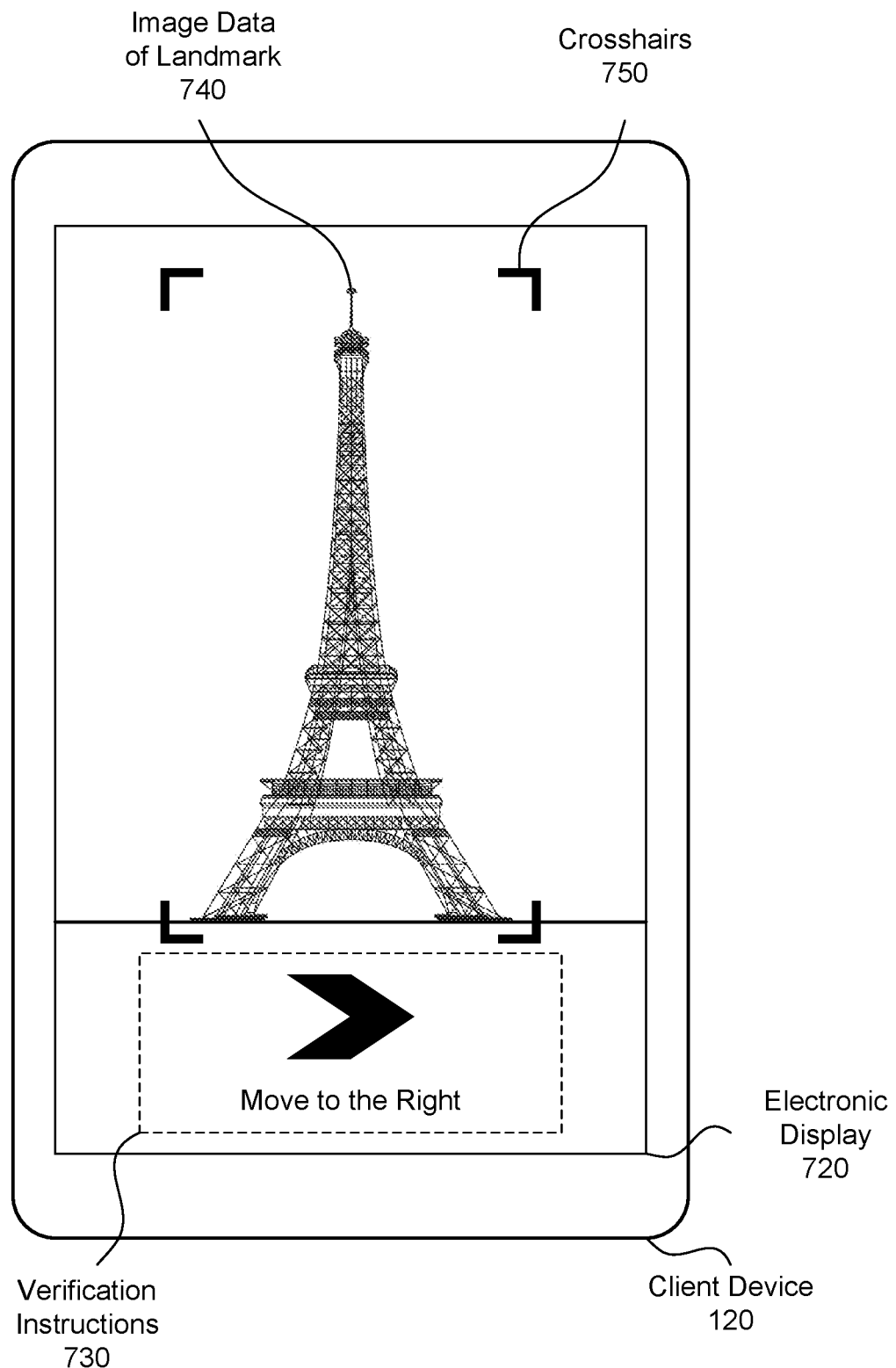
FIG. 7 is an illustration of a game interface while in the method of FIG. 6, according to one embodiment.

Referring now to FIG. 7, game interface while in the method of FIG. 6. The client device 120 provides prompts of the verification instructions 730 to a player on an electronic display 720 according to the method 600. According to step 620, the client device 120 prompts the player to move along a verification pathway while capturing image data of the landmark based on the verification instructions 730. In this embodiment, the client device 120 provides the prompted verification instructions 730 on the electronic display 720. According to this illustration, steps of the verification pathway are prompted on a portion of the electronic display 720 guiding the player to move along the verification pathway with the client device 120. The electronic display 720 may also display a real-time view of the camera's perspective or captured image data of the landmark 740 including initially captured image data of the landmark according to step 614 or step 620 of the method 600. The electronic display 720 may also have crosshairs 750 that provide a guide for the player to capture the landmark within. In some cases, the client device 120 may alert the player if the image data of the landmark 740 falls outside the portion of the image data defined by the crosshairs 750. The client device 120 can progressively provide steps of the verification instructions 730 according to further steps of the method 600.

Referring back to FIG. 6, the client device 120 at step 622 of the method 600 receives image data of the landmark during and/or after moving along the verification pathway. The image data may be captured via one or more cameras part of the client device 120. The image data may comprise any combination of videos or pictures depending on what type image data is prompted for capture according to the verification instructions.

The client device 120 at step 624 of the method 600 verifies the image data of the landmark with the verification instructions. The client device 120 determines that the image data of the landmark positively matches the landmark. In one embodiment, the client device 120 verifies that a captured picture during or after movement along the verification pathway positively matches the landmark (e.g., via the landmark recognition model). In another embodiment, the client device 120 selects one or more frames of a video captured during and/or after movement along the verification pathway and verifies that the one or more frames positively match the landmark (e.g., via the landmark recognition model). After the client device 120 verifies that the captured image data matches the landmark, the client device 120 then verifies whether the captured image data during and/or after the movement along the verification pathway is from a different perspective compared to the initial image data. In embodiments where the initial image data is an initial picture of the landmark, the client device 120 determines whether or not the newly captured image data (either a newly capture picture or newly captured video) has perspectives different from a perspective of the initial picture. In some embodiments, the landmark recognition model also determines a perspective of the landmark for a positively identified picture of the landmark. In these embodiments, the client device 120 may compare determined perspectives against the initial perspective of the initial image data. After verifying that both the newly captured image data positively matches the landmark and that the newly captured image data is of a different perspective from the initial perspective, then the client device 120 confirms that the client device 120 location is accurate and has been verified upon completion of the verification instructions.

In embodiments of the verification instructions prompting capturing video of the landmark, the client device 120 may verify multiple frames in the video at step 624 of the method 600. After each subsequent verification of the frame, the client device 120 may prompt 620 the player with another prompt included in the verification instructions while still capturing video of the landmark. The client device 120 continually receives 622 frames of the video being captured by the client device 120. The client device 120 may subsequently verify 624 the frames continually received. In one or more embodiments, the client device 120 verifies 624 every nth (e.g., $2^{nd}$, $3^{rd}$, $4^{th}$, $5^{th}$, $6^{th}$, $7^{th}$, $8^{th}$, $9^{th}$, $10^{th}$, etc.) frame of the video.

In an alternate embodiment, the client device 120 at optional step 626 of the method 600 receives client movement data from movement sensors. In this alternate embodiment, before the client device 120 returns a confirmation of the client device's 120 location being accurate and verified, the client device 120 also verifies whether the movement data matches with the prompted verification pathway. In some embodiments, the client device 120 movement data contains up movement data up to six degrees of freedom (i.e., three translational degrees of freedom and three rotational degrees of freedom). The movement sensors on the client device may be any combination of accelerometers, gyroscopes, other inertial measurement units, etc.

At optional step 628 of the method 600, the client device 120 verifies that the movement data matches the verification pathway with the verification instructions. The movement data, as mentioned above, may comprise movement data up to six degrees of freedom. In one simple embodiment, the client device 120 verifies whether one or more degrees of freedom has movement (either translational or rotational) above a threshold amount. In another embodiment, the client device 120 verifies that the movement data correctly corresponds to prompted movement at step 620. The client device 120 may use the movement data to estimate a distance travelled in a direction which can be compared against the verification pathway prompted at step 620. The client device 120 may also confirm that the movement data matches the verification pathway given that the estimated distance travelled in response to each step of the verification pathway is within a threshold tolerance of error. For example, the client device 120 confirms that the movement data matches the verification pathway if the movement data results in an estimate within a few paces of the verification pathway. Following up with example A, the client device 120 may verify that the movement data matches the verification pathway if the movement data results in an estimate of moving forward towards the landmark roughly four meters in response to prompting of step (2) and turning approximately left and moving forward roughly two meters in response to prompting of step (3). Once the client device 120 confirms the movement data matches the verification pathway, the client device 120 may then confirm that the client device's 120 location is accurate and has been verified according to completion of the verification instructions.

In further embodiments where the verification instructions comprise prompts for additional player inputs, the client device 120 in optional steps of the method 600 verify that additional player inputs match those that are prompted by the client device 120 according to the verification instructions. In this alternate embodiment, the client device 120 receives additional player inputs to the client device 120. Before the client device 120 returns a confirmation of the client device's 120 location being accurate and verified, the client device 120 also verifies whether the additional player inputs matches with the prompted verification instructions. The client device 120 may verify that the additional player inputs match prompted verification instructions and that the additional player inputs are timed according to the prompted verification instructions. Following up with example B, the client device 120 may verify that a received acoustic signal matches to the player stating the landmark's name in response to step (3). The client device 120 may further verify whether the acoustic signal of the player stating the landmark's name is appropriately timed between step (2) and step (4). Following up with example C, the client device 120 may, similar to example B, verify that a received player input of a button on the client device 120 matches step (3) and is appropriately timed between step (2) and step (4). Upon verifying that the additional player inputs positively match to prompted instructions, the client device 120 may then confirm that the client device's 120 location is accurate and has been verified according to completion of the verification instructions.

The method 600 may continue with the client device 120 preparing a confirmation receipt verifying the client device's 120 location. In some embodiments, the client device 120 only sends a confirmation receipt pending all steps within the verification instructions altogether verify the client device's 120 location. In other embodiments, the client device 120 may send a confirmation receipt pending steps 618 and 624 are verified. The game server 110 may receive the confirmation receipt and proceed with providing the game content specific to the location of the client device 120.

The method 600 aids in prevention of spoofing by spoofers. Spoofers, as described above, aim to cheat the game server by attempting to retrieve game content tied to a specific location without being physical present at that specific location. The method 600 proves difficult for spoofers to bypass. If the player is prompted simply to capture a picture of the landmark in proximity to their supposed location, a spoofer could easily fool the verification process by using a pre-captured image of the landmark. The method 600 defends against such spoofers with providing additional instructions of moving the player along a verification pathway while capturing image data. Not only would a spoofer need to retrieve more comprehensive image data, but the method 600 could also randomize the verification pathway for each instance of verification. For example, the spoofer may attempt to fool the method 600 by searching for image data (pictures or video) of the landmark according to previous verification pathways; however, the method 600 may provide a new randomized verification pathway which renders other image data according to other verification pathways useless. Additionally embodiments with the additional instructions would greater increase the challenge for the spoofer to predict what kind of additional instructions may be prompted making the method 600 even more foolproof. The method 600 additionally benefits for being minimally invasive to fair players playing the parallel reality game. For players actually present at a specific location when their client device is requesting game content tied to the specific location, the players are prompted with a few short instructions that can be achieved quickly when actually present at the specific location.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer readable storage medium with encoded instructions for verifying a geographical position of a client device that, when executed by a processor, cause the processor to:

transmit location information of the client device to a server, the location information specifying the geographical position of the client device;

receive verification instructions from the server comprising a landmark in proximity to the geographical position of the client device and a verification pathway for the client device;

prompt a user of the client device to capture image data of the landmark from the verification instructions;

receive a first set of image data of the landmark from an initial perspective of the client device;

determine the first set of image data matches to the landmark;

prompt the user to move the client device along the verification pathway from the verification instructions;

receive a second set of image data of the landmark from a moving perspective of the client device;

determine whether the second set of image data matches to an expected change in perspective of the landmark; and confirm that the client device is at the geographical position if the second set of image data matches to the expected change in perspective of the landmark.

2. The storage medium of claim 1, wherein the first set of image data and the second set of image data is captured by a camera that is a component of the client device.

3. The storage medium of claim 1, wherein the first set of image data comprises an initial picture of the landmark from the initial perspective.

4. The storage medium of claim 1, wherein the second set of image data comprises a video of the landmark from the moving perspective of the camera.

5. The storage medium of claim 1, wherein the second set of image data comprises a new picture of the landmark from a new perspective of the landmark, wherein the new perspective of the landmark is in the moving perspective of the camera.

6. The storage medium of claim 1, wherein the expected change in perspective of the landmark is in the verification instructions and is a predicted perspective of the landmark according to movement of the client device along the verification pathway.

7. The storage medium of claim 1, wherein determine the second set of image data matches to an expected change in perspective of the landmark comprises:

determine the second set of image data from the moving perspective of the camera comprises a new picture from a new perspective of the landmark compared to the first set of image data.

8. The storage medium of claim 1, wherein prompt the user to move along the verification pathway from the verification instructions further comprises:

prompt the user to capture image data of the landmark whilst moving along the verification pathway.

9. The storage medium of claim 1, wherein the moving perspective of the camera corresponds to a range of perspectives of the client device while in movement along the verification pathway.

10. The storage medium of claim 1, further encoded with instructions that, when executed by the processor, cause the processor to:

receive a set of movement data from a movement sensor on the client device; and determine the set of movement data is consistent with the client device moving along the verification pathway.

11. The storage medium of claim 10, wherein the movement sensor is an inertial measurement unit recording translational movement of the client device, and the set of movement data comprises translational movement of the client device, and wherein determine the set of movement data matches the verification pathway comprises:

determine the translation movement of the client device is consistent with the client device moving along the verification pathway.

12. The storage medium of claim 1, further encoded with instructions that, when executed by the processor, cause the processor to:

transmit the confirmation of the geographical position of the client device to the server;

receive content for display on the client device specific to the geographical position of the client device from the server; and display content received from the server on the client device.

13. The storage medium of claim 12, wherein the server is a game server hosting a parallel reality game, wherein the content comprises game content from the parallel reality game specific to the geographical position of the client device, and wherein the user is a player of the parallel reality game.

14. The storage medium of claim 1, wherein determine the first set of image data matches to the landmark comprises:

apply a landmark recognition model to determine whether the first set of image data matches to the landmark, the landmark recognition model trained based on training image data of the landmark and capable of determining whether image data matches to the landmark.

15. The storage medium of claim 1, further encoded with instructions that, when executed by the processor, cause the processor to:

prompt the user to provide additional input to the client device during movement along the verification pathway;

receive an additional input to the client device during movement of the client device along the verification pathway; and determine whether the additional input matches to the prompted additional input during movement along the verification pathway, wherein the confirmation of the geographical position of the client device to the server is further dependent on the determination that the additional input matches to the prompted additional input.

16. The storage medium of claim 15, wherein the prompted additional input comprises a speech, wherein the received additional input is an acoustic signal received by the client device during movement of the client device along the verification pathway, and wherein determine whether the additional input matches to the prompted additional input during movement along the verification pathway comprises determine whether the acoustic signal matches the speech.

17. A computer-implemented method for generating verification instructions for use by a client device in verifying a geographical position of the client device comprising:

receiving location information of the client device by a server, the location information specifying the geographical position of the client device;

accessing a landmark database by the server;

retrieving a landmark from the landmark database according to the geographical position of the client device received in the location information; and generating a verification pathway describing a route to be prompted by the client device to a user of the client device;

generating verification instructions comprising the landmark and the verification pathway; and transmitting the verification instructions to the client device.

18. The method of claim 17, further comprising:

retrieving a landmark recognition model for determining whether image data matches to the landmark, the landmark recognition model trained based on training image data of the landmark;

wherein the verification instructions also comprise the landmark recognition model.

19. The method of claim 17, further comprising:

receiving a confirmation of the geographical position of the client device from the client device;

retrieving content specific to the geographical position of the client device; and providing the content to the client device for display.

20. A system comprising:

a processor; and a computer-readable storage medium with encoded instructions for verifying a geographical position of a client device that, when executed by the processor, cause the processor to:

transmit location information of the client device to a game server hosting a parallel reality game, the location information specifying the geographical position of the client device;

receive verification instructions from the game server comprising a landmark in proximity to the geographical position of the client device and a verification pathway for the client device;

prompt a player of the parallel reality game using the client device to capture image data of the landmark from the verification instructions;

receive a first set of image data of the landmark from an initial perspective of the client device;

determine the first set of image data matches to the landmark by applying a landmark recognition model to determine whether the first set of image data matches to the landmark, the landmark recognition model trained based on training image data of the landmark and capable of determining whether image data matches to the landmark, prompt the player to move the client device along the verification pathway from the verification instructions;

receive a second set of image data of the landmark from a moving perspective of the client device;

determine whether the second set of image data matches to an expected change in perspective of the landmark;

confirm that the client device is at the geographical position if the second set of image data matches to the expected change in perspective of the landmark;

transmit the confirmation of the geographical position of the client device to the game server;

receive game content from the game server for display on the client device specific to the geographical position of the client device; and display game content received from the game server on the client device.

* * * * *